United States Patent
Lee et al.

(10) Patent No.: US 7,546,179 B2
(45) Date of Patent: *Jun. 9, 2009

(54) METHOD AND APPARATUS FOR ALLOWING MOBILE ROBOT TO RETURN TO DOCKING STATION

(75) Inventors: Hyoung-ki Lee, Gyeonggi-do (KR); Sun-gi Hong, Gyeonggi-do (KR); Seok-won Bang, Seoul (KR); Il-hwan Kim, Seoul (KR); Ki-wan Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 680 days.

This patent is subject to a terminal disclaimer.

(21) Appl. No.: 10/823,548

(22) Filed: Apr. 14, 2004

(65) Prior Publication Data

US 2004/0210346 A1   Oct. 21, 2004

(30) Foreign Application Priority Data

Apr. 15, 2003    (KR) ............... 10-2003-0023716

(51) Int. Cl.
*G06F 19/00* (2006.01)
*G05B 15/00* (2006.01)
*B25J 9/16* (2006.01)
*B25J 5/00* (2006.01)
*G08B 21/00* (2006.01)
*E04H 6/00* (2006.01)

(52) U.S. Cl. ............... 700/245; 701/300; 701/23; 701/24; 701/25; 701/41; 700/258; 700/259; 318/568.1; 318/568.12; 318/568.16; 318/568.17; 340/636.15; 340/636.2; 414/227

(58) Field of Classification Search ............... None
See application file for complete search history.

(56) References Cited

U.S. PATENT DOCUMENTS

| 4,679,152 | A | * | 7/1987 | Perdue ............... 701/23 |
| 4,777,416 | A | * | 10/1988 | George et al. ......... 318/568.12 |
| 4,809,936 | A | * | 3/1989 | Whitaker ............. 244/172.4 |
| 5,646,494 | A | * | 7/1997 | Han ................ 318/587 |

(Continued)

FOREIGN PATENT DOCUMENTS

JP    2000-56006    2/2000

(Continued)

*Primary Examiner*—Dalena Tran
*Assistant Examiner*—Ian Jen
(74) *Attorney, Agent, or Firm*—Staas & Halsey LLP

(57) ABSTRACT

A method and apparatus allowing a mobile robot to return to a designated location the method including: calculating a first direction angle of the mobile robot at a second location arrived at after the mobile robot travels a predetermined distance from the first location; determining whether the mobile robot approaches or moves away from the designated location, at a third location arrived at after the mobile robot rotates by the first direction angle and then travels a predetermined distance; and if the result of the determination indicates that the mobile robot approaches the docking station, controlling the mobile robot to travel according to the first direction angle, and if the result indicates the mobile robot moves away from the docking station, calculating a second direction angle of the mobile robot at the third location, and controlling the mobile robot to travel according to the second direction angle.

27 Claims, 8 Drawing Sheets

U.S. PATENT DOCUMENTS

| | | | |
|---|---|---|---|
| 5,794,166 A * | 8/1998 | Bauer et al. | 701/23 |
| 6,138,063 A | 10/2000 | Himeda | |
| 6,254,035 B1 * | 7/2001 | Howard et al. | 244/172.4 |
| 6,278,917 B1 * | 8/2001 | Bauer et al. | 701/23 |
| 6,308,114 B1 * | 10/2001 | Kim | 700/245 |
| 6,338,013 B1 | 1/2002 | Ruffner | |
| 6,496,754 B2 * | 12/2002 | Song et al. | 700/245 |
| 6,580,246 B2 * | 6/2003 | Jacobs | 318/568.16 |
| 6,586,908 B2 * | 7/2003 | Petersson et al. | 320/107 |
| 6,748,297 B2 * | 6/2004 | Song et al. | 700/259 |
| 7,031,805 B2 * | 4/2006 | Lee et al. | 700/245 |
| 2002/0153185 A1 * | 10/2002 | Song et al. | 180/167 |
| 2004/0158354 A1 * | 8/2004 | Lee et al. | 700/245 |
| 2004/0204804 A1 * | 10/2004 | Lee et al. | 701/23 |

FOREIGN PATENT DOCUMENTS

| | | |
|---|---|---|
| JP | 2001-125641 | 5/2001 |
| KR | 2000-66728 | 4/1999 |
| KR | 2002-33303 | 10/2000 |
| KR | 2000-0066728 | 11/2000 |

* cited by examiner

METHOD AND APPARATUS FOR ALLOWING MOBILE ROBOT TO RETURN TO DOCKING STATION

CROSS-REFERENCE TO RELATED APPLICATIONS

This application claims the benefit of Korean Patent Application No. 2003-23716, filed on Apr. 15, 2003, in the Korean Intellectual property Office, the disclosure of which is incorporated herein by reference.

BACKGROUND OF THE INVENTION

1. Field of the Invention

The present invention relates to controlling a robot, and more particularly, to a method and apparatus for automatically allowing a mobile robot, which autonomously travels a predetermined space, to return to a docking station or a designated location when a predetermined job is completed.

2. Description of the Related Art

A variety of movable robots, which generally include a driving means, a sensor and a travel controller, and perform many useful functions while autonomously operating, have been developed. For example, a home cleaning robot is a cleaning device that sucks dust and dirt from the floor of a room while autonomously moving around the room without a user's manipulation. The home cleaning robot determines distances between furniture, office supplies, and walls in the room, which could be obstacles to its movement, by using its sensor or sensors and cleans the floor while controlling its movement based on the determined distances to avoid collision with any of the obstacles in the room. If the cleaning of the desired area is completed, the cleaning robot stops the cleaning work and at the same time stops the travel operation. As a result, the robot is left at a location distant from a predetermined location, for example, the robot is left at a location far from the docking station or designated location, such that the user frequently experiences various inconveniences. Accordingly, a technology by which after completing a predetermined job, a mobile robot, such as a cleaning robot, automatically returns to the docking station or a designated location is needed.

Among technologies for detecting the location of a mobile robot related to allowing a mobile robot to return to a docking station, there are Korean Patent Laid-open Publication Nos. 2000-66728 and 2002-33303, U.S. Pat. Nos. 6,338,013 and 6,138,063, and Japanese Patent Laid-open Publication No. 2000-56006. Korean Patent Laid-open Publication No. 2000-66728 relates to a robot capable of detecting a sound direction and a motion direction and with an intelligent function of automatic charge, and discloses an algorithm for the robot to return to an automatic charger by measuring the direction of sound. For this, if sound with a predetermined frequency is generated and output from a charger or the like, the robot detects the direction of the sound so that the robot can dock with the charger. This technology can measure and control only the direction of the robot. Korean Patent Laid-open Publication No. 2002-33303 relates to an apparatus for recognizing the location of a robot in a robot soccer game machine, and only the location of a robot is recognized by using a plurality of beacons. U.S. Pat. No. 6,338,013 discloses a multifunctional, mobile appliance using a high precision positioning system capable of determining the location of a robot when the robot travels or stops. U.S. Pat. No. 6,138,063 discloses an apparatus which uses a gyrosensor to detect a direction angle so that a cleaning robot can autonomously modify the direction of travel and accurately arrive at a target location of travel. Japanese Patent Laid-open Publication No. 2000-56006 discloses a robot capable of accurately recognizing its location through a transmission and reception apparatus capable of communicating a predetermined signal with a fixed station.

However, the above-mentioned techniques are somewhat expensive to implement because they presuppose additional tools, such as a plurality of beacons or gyro-sensors, to recognize the location of a home cleaning robot or to detect directional angles.

SUMMARY OF THE INVENTION

The present invention provides a method for allowing a mobile robot, which autonomously travels a predetermined space, to automatically return to a docking station by using simplified hardware when a predetermined job is completed or charging is needed.

The present invention also provides an apparatus most appropriate to the method for allowing a mobile robot to return to a docking station or a designated location.

According to an aspect of the present invention, there is provided a method for allowing a mobile robot to return to a docking station or a designated location, wherein the docking station or designated location have a sound wave transmitter and the mobile robot has a sound wave receptor and the mobile robot automatically returns from a first location to the designated location, the method including: calculating a first direction angle of the mobile robot at a second location arrived at after the mobile robot travels a predetermined distance from the first location; determining whether the mobile robot approaches or moves away from the designated location, at a third location arrived at after the mobile robot rotates by the first direction angle and then travels a predetermined distance; and if the result of the determination indicates that the mobile robot approaches the designated location, controlling the mobile robot to travel according to the first direction angle, and if the result indicates the mobile robot moves away from the designated location, calculating a second direction angle of the mobile robot at the third location, and controlling the mobile robot to travel according to the second direction angle.

According to another aspect of the present invention, there is provided an apparatus for allowing a mobile robot to automatically return to a designated location from a first location, the apparatus including: a sound wave transmitter installed in the designated location; a sound wave receptor installed in the mobile robot; a distance calculator which calculates the distance between the designated location and the mobile robot, by using the time difference between times of transmission and reception of a sound wave transmitted by the sound wave transmitter to the sound wave receptor; an encoder connected to at least one or more motors and measuring the travel distance and travel direction of the mobile robot; and a travel controller which by using the distance value calculated in the distance calculator and the travel distance measured by the encoder, calculates a first direction angle at a second location arrived at after the mobile robot travels a predetermined distance from the first location, determines whether the mobile robot approaches or moves away from the designated location, at a third location arrived at after the mobile robot is rotated by a first direction angle and travels a predetermined distance, and controls the mobile robot to travel according to the result of the determination.

The apparatus further includes a compensator which receives inputs of a linear velocity command and an angular velocity command provided by the travel controller, the location and direction information of the mobile robot provided by the encoder, and distance information calculated by the distance calculator, and by using a Kalman filtering technique, compensates for an error between a travel distance measured by the encoder and the actual travel distance.

According to another aspect of the invention, there is provided, a computer readable medium encoded with processing instructions for performing a method of allowing a mobile robot to return to a designated location, wherein the designated location has a sound wave transmitter and the mobile robot has a sound wave receptor and the mobile robot automatically returns from a first location to the designated location, the method including: calculating a first direction angle of the mobile robot at a second location arrived at after the mobile robot travels a first distance from the first location; determining whether the mobile robot approaches or moves away from the designated location, at a third location arrived at after the mobile robot rotates by the first direction angle and then travels a second distance; and if the result of the determination indicates that the mobile robot approaches the designated location, controlling the mobile robot to travel according to the first direction angle, and if the result indicates the mobile robot moves away from the designated location, calculating a second direction angle of the mobile robot at the third location, and controlling the mobile robot to travel according to the second direction angle.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
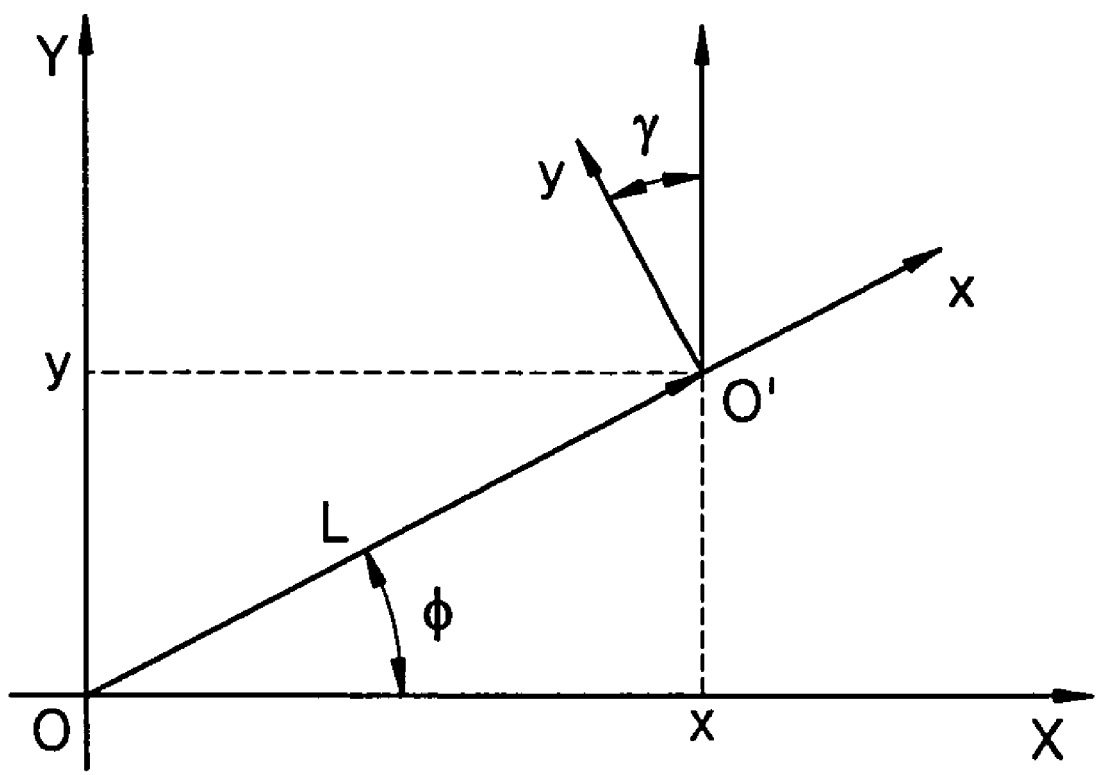
FIG. 1 is a diagram illustrating coordinates (x, y, γ) expressing the locations and directional relations of a mobile robot and a docking station.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a diagram illustrating a (x, y, γ) coordinate system that represents a location of a mobile robot and a direction in which the mobile robot faces. In FIG. 1, the origin O, represents a location of a docking station or a designated location, (x, y) represents a current location of the mobile robot, and y represents a direction in which the mobile robot faces. Also, (x, y) may possibly be replaced by polar coordinates (L, Φ).

Figure 2:
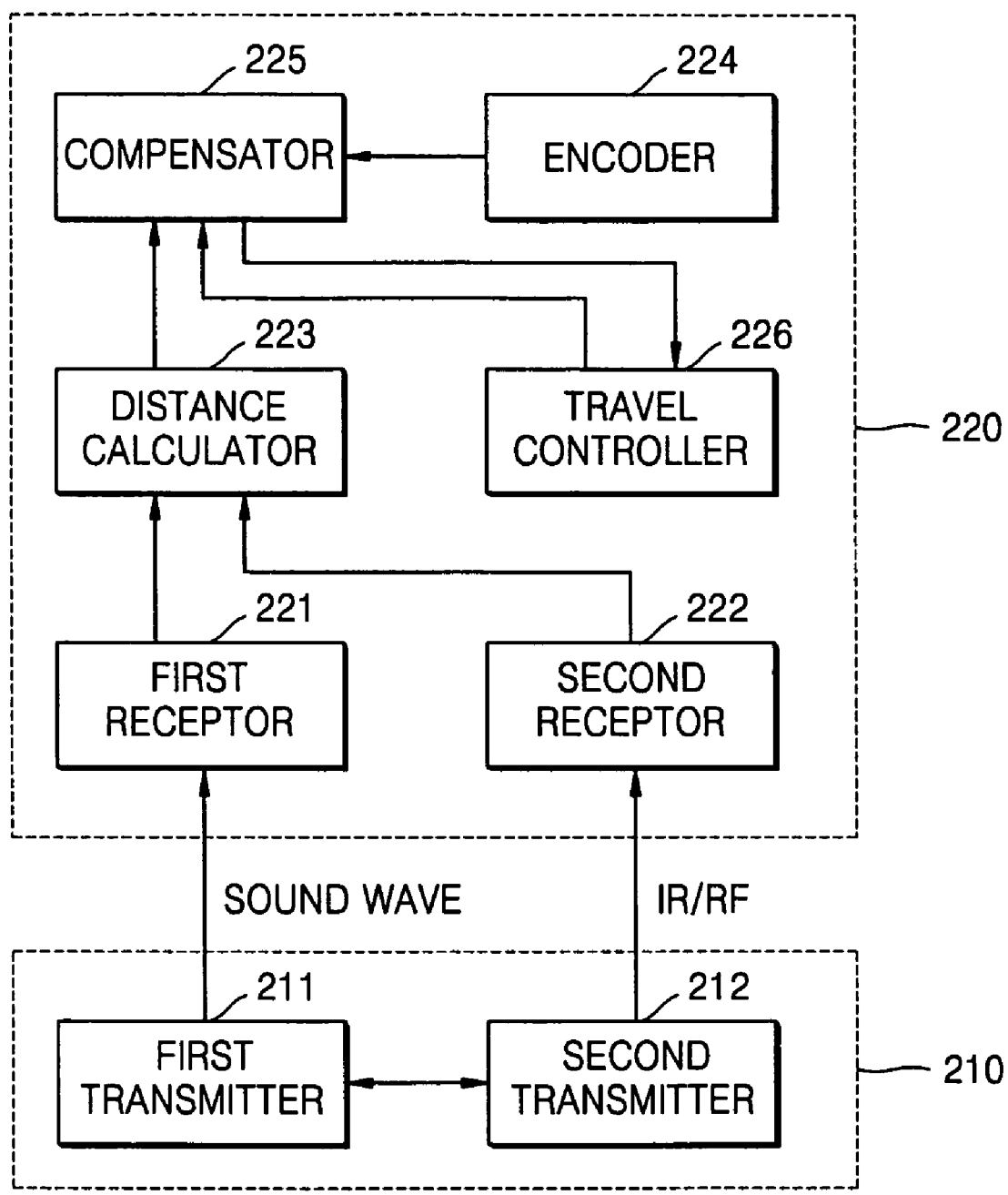
FIG. 2 is a block diagram of the structure of an embodiment of an apparatus for allowing a mobile robot to return to a docking station according to the present invention.

FIG. 2 is a block diagram showing the structure of an apparatus for allowing a mobile robot to return to a docking station or a designated location according to an embodiment of the present invention. Referring to FIG. 2, the apparatus includes a docking station or a designated location 210 and a mobile robot 220. The docking station or designated location include first and second transmitters 211 and 212, and the mobile robot 220 includes first and second receptors 221 and 222, a distance calculator 223, an encoder 224, a compensator 225 and a travel controller 226.

The first transmitter 211 of the docking station or designated location 210 generates a sound wave to detect a location of the mobile robot 220. When the sound wave is generated and transmitted from the first transmitter 211, the second transmitter 212 generates and transmits a time synchronization signal. The speed of the transmission of the time synchronization signal is much faster than the speed of the transmission of the sound wave. In this respect, the time synchronization signal may be either an infrared (IR) signal or a radio frequency (RF) signal, and the sound wave generated by the first transmitter 211 could be an ultrasonic wave.

In the mobile robot 220, the first receptor 221, which includes an all-directional sound wave sensor, receives the sound wave transmitted from the first transmitter 211 of the docking station or designated location 210. The second receptor 222 receives the time synchronization signal transmitted from the second transmitter 212 of the docking station or designated location 210. The distance calculator 223 calculates a distance between the first transmitter 211 and the first receptor 221, i.e., a distance between the docking station 210 and the mobile robot 220, based on a gap between the time when the second receptor 222 receives the time synchronization signal and the time when the first receptor 221 receives the sound wave.

The encoder 224 is installed in each of at least one or more motors (not shown) to drive the mobile robot 220 and by detecting the rotation frequency of the motor, measures the travel distance and the travel direction at a previous location and those at the current location of the mobile robot 220. By using a Kalman filtering technique, the compensator 225 compensates for an error caused by slipping on the ground and the like, between the travel distance measured in the encoder 224 and the actual travel distance.

By using the distance value calculated in the distance calculator 223 and the travel distance measured in the encoder 224, the travel controller 226 calculates a first direction angle at a second location, arrived at after the robot 220 travels a predetermined distance from a first location where a predetermined job is completed or charging is needed, and calculates a second direction angle at a third location, arrived at after the robot 220 is turned by the first direction angle and then travels a predetermined distance. Then, when the mobile robot 220 turns by the first direction angle in the direction opposite to the location of the docking station 210 and travels a predetermined distance, the robot 220 is controlled to travel according to the first or second direction angle, depending on the result of comparison of an estimated distance to the docking station 210 with the distance to the docking station 210 from the third location.

Figure 3:
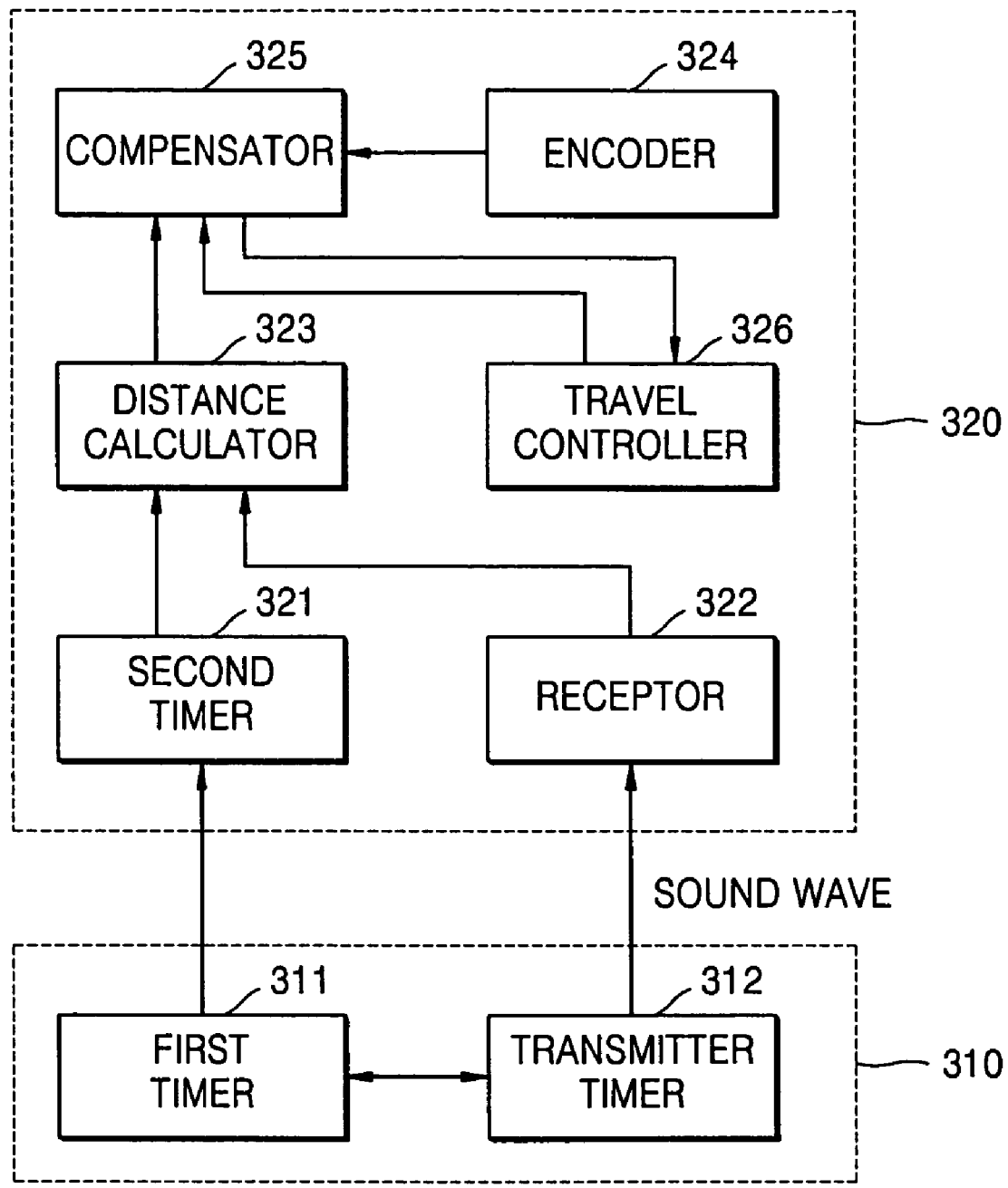
FIG. 3 is a block diagram of the structure of another embodiment of an apparatus for allowing a mobile robot to return to a docking station according to the present invention.

FIG. 3 is a block diagram showing the structure of an apparatus for allowing a mobile robot to return to a docking station according to another embodiment of the present invention. Referring to FIG. 3, the apparatus includes a docking station 310 and a mobile robot 320. The docking station 310 includes a first timer 311 and a transmitter 312, and the mobile robot 320 includes a second timer 321, a receptor 322, a distance calculator 323, an encoder 324, a compensator 325, and a travel controller 326.

In the present embodiment, the first and second timers 311 and 321 are used instead of the second transmitter 212 and the second receptor 222, respectively. In the previous embodiment, the second transmitter 212 transmits a time synchronization signal to the second receptor 222, and the second receptor 222 receives the time synchronization signal from the second transmitter 212. In the present embodiment, the first and second timers 311 and 321 may be separate elements or may be replaced by a microprocessor that constitutes the travel controller 326 and serves timer functions. The encoder 324, the compensator 325, and the travel controller 326 are the same as their respective counterparts of FIG. 2, and thus their descriptions will not be repeated here. Therefore, detailed descriptions of only the first and second timers 311 and 321, the transmitter 312, the receptor 322, and the distance calculator 323, will be presented.

The transmitter 312 of the docking station 310 generates a sound wave in synchronization with a timing signal generated by the first timer 311 and transmits the sound wave to detect a location of the home cleaning robot 320. The first timer 311 generates the timing signal, which is comprised of a series of pulses, so that the transmitter 312 can generate sound waves at predetermined time intervals.

The receptor 322, which is, for example, an all-directional sound wave sensor of the mobile robot 320, receives the sound wave transmitted from the transmitter 312 of the docking station 310. The second timer 321 generates the same timing signal that the first timer 311 generates and outputs the timing signal to the distance calculator 323. The distance calculator 323 calculates a distance between the transmitter 312 and the receptor 322, i.e., a distance between the docking station 310 and the mobile robot 320, based on a difference between the time when the second timer 321 generates the timing signal and the time when the receptor 322 receives the sound wave from the transmitter 312.

Figure 4:
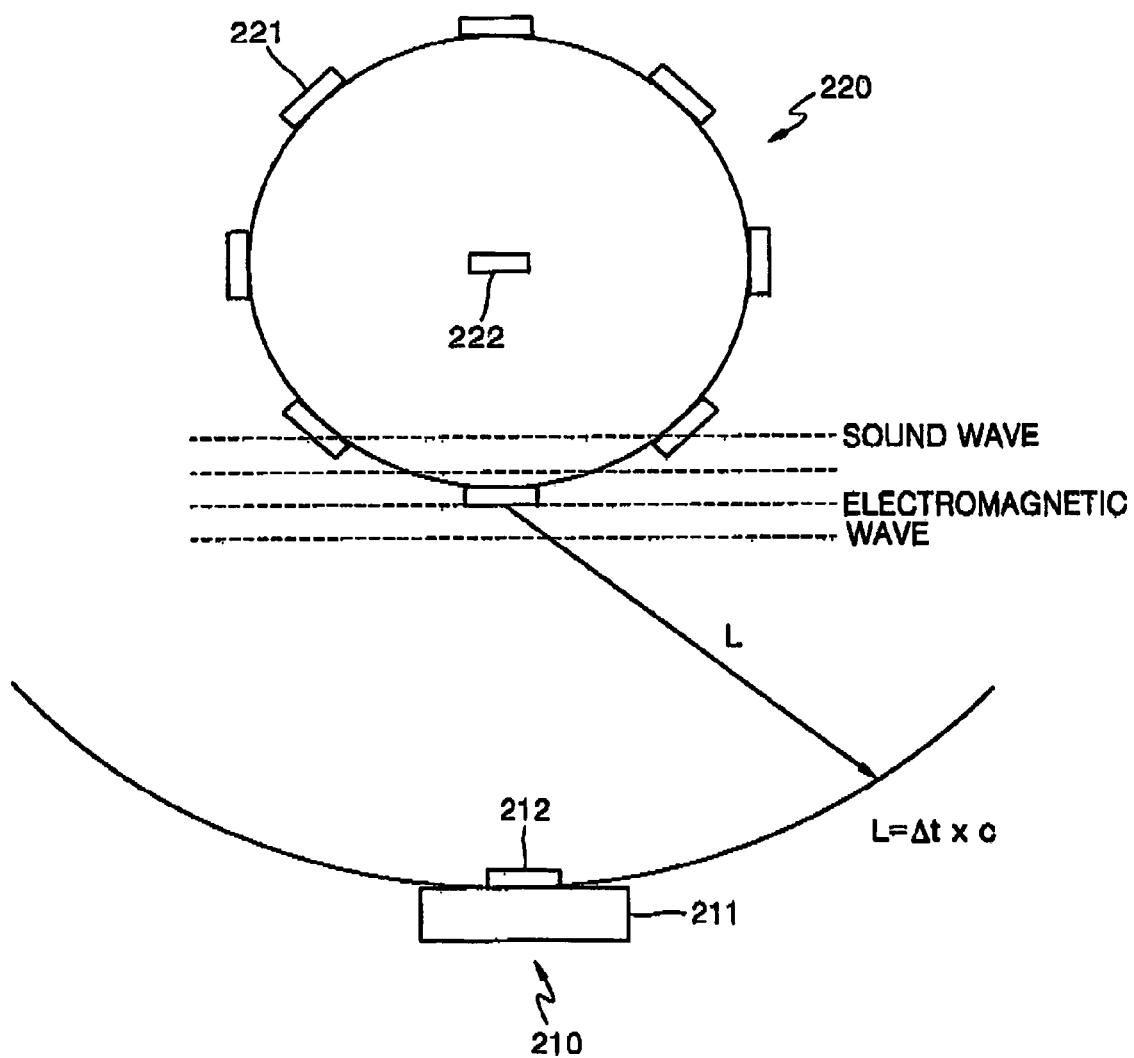
FIG. 4 is a diagram explaining the operation of a distance calculator in any one of FIGS. 2 and 3.

FIG. 4 is a diagram illustrating the operation of the distance calculator 223 of FIG. 2. The distance calculator 223 receives the time, that is, a first time when the first receptor 221 receives a sound wave from the first transmitter 211 and the time, that is a second time when the second receptor 222 receives a time synchronization signal from the second transmitter 212, calculates a difference ∆t between the first time and the second time and then calculates a distance L between the docking station 210 and the mobile robot 220 using this difference ∆t.

$$L = \Delta t \cdot c \quad (1)$$

where, c is the speed of sound, i.e., 340 m/sec.

In other words, when the first and second transmitters 211 and 212 of the docking station 210 transmit a sound wave and a time synchronization signal, respectively, the distance calculator 223 receives a signal indicating a first time when the first receptor 221 receives the sound wave and receives a signal indicating a second time when the second receptor 222 receives the time synchronization signal and calculates the distance L between the mobile robot 220 and the docking station 210 by calculating the difference ∆t between the two times and multiplying ∆t by c.

On the other hand, the distance calculator 323 of FIG. 3 receives a signal indicating a first time when the receptor 322 receives a sound wave and a signal indicating a second time when the second timer 321 generates the same timing signal as that provided by the first timer 311 and calculates the distance L between the mobile robot 320 and the docking station 310 based on a difference ∆t between these two times using Equation (1). In other words, if the sound wave is transmitted from the transmitter 312 to the receptor 322 in synchronization with the timing signal provided by the first timer 311, the distance calculator 323 calculates the distance L between the mobile robot 320 and the docking station 310 by calculating the difference ∆t and multiplying ∆t by c.

Figure 5:
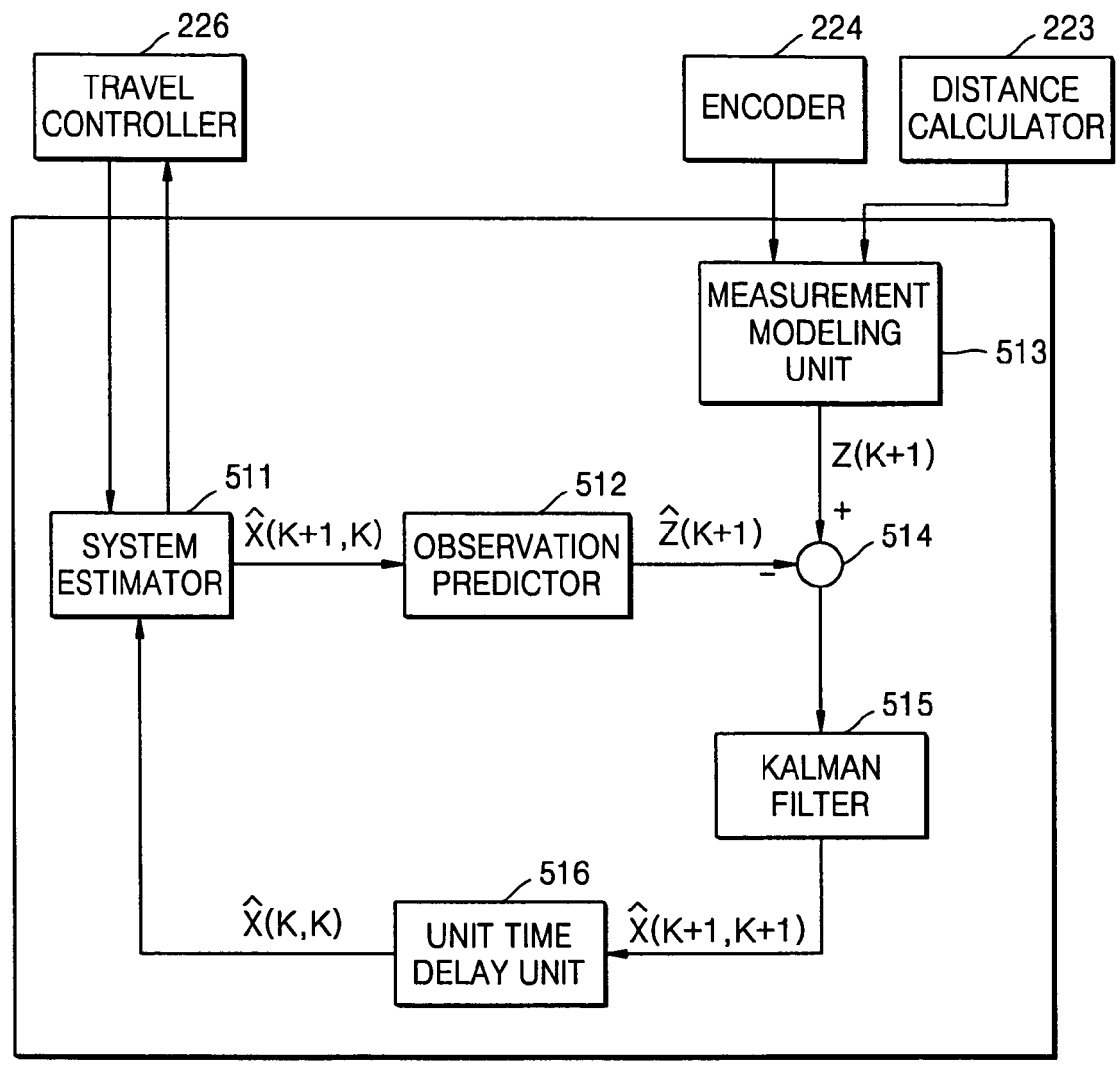
FIG. 5 is a block diagram explaining a detailed structure of a compensator in any one of FIGS. 2 and 3.

FIG. 5 is a block diagram explaining a detailed structure of a compensator 225 or 325 in any one of FIGS. 2 and 3. The compensator 225 or 325 comprises a system estimator 511, an observation predictor 512, a measurement modeling unit 513, a subtractor 514, a Kalman filter 515 and a unit time delay unit 516.

Before explaining the operation of the compensator 225, modeling the location and direction of the mobile robot 220 will be explained.

First, the equation of motion of the mobile robot 220 can be expressed by coordinates (x, y, γ) shown in FIG. 1, as the following equation 2:

$$\dot{x}(t) = v(t)\cos\gamma(t)$$

$$\dot{y}(t) = v(t)\sin\gamma(t)$$

$$\dot{\gamma}(t) = \omega(t) \quad (2)$$

In Equation (2), v(t) represents a linear velocity command, and w(t) represents an angular velocity command. In a desired system, the command values of a location and direction matches the actual travel distance and direction.

Meanwhile, discrete system modeling of the location and direction of the mobile robot 220 can be expressed by the following equation 3:

$$X(k+1) = x(k) + f(X(k), U(k)) \quad (3)$$

Here, $X(k) = [x(k) y(k) \gamma(k)]^T$ $U(k) = [v(k) \omega(k)]^T$ $$f(X(k), U(k)) = \begin{bmatrix} T\cos\gamma(k) & 0 \\ T\sin\gamma(k) & 0 \\ 0 & T \end{bmatrix},$$

where T denotes a sampling time.

Also, measurement modeling of the location and direction of the mobile robot 220 can be expressed by the following equation 4:

$$Z(k+1) = G(X(k+1)) + \mu(k)$$

$$Z(k) = [x(k) y(k) R(k)]$$

$$G(X(k)) = \begin{bmatrix} x(k) \\ y(k) \\ \gamma(k) \\ \sqrt{x^2(k) + y^2(k)} \end{bmatrix} \quad (4)$$

Here, µ(k) denotes measurement noise caused by the encoder 224 or the distance calculator 223 and has a Gaussian probability distribution of N(0, S(k)), where S(k) denotes a covariance matrix of the measuring noise. Also, x(k), y(k), γ(k) denote a measured location and direction value obtained from the encoder 224 of the motor in the mobile robot 220, and R(k) denotes a measured distance value obtained by the distance calculator 223.

Referring to FIG. 5, the system estimator 511, in response to the linear velocity command (v(t)) and the angular velocity command (w(t)) provided by the travel controller 226, outputs system estimation value $\hat{X}(k+1,k)$. At this time, system estimation value $\hat{X}(k+1,k)$ is expressed as the following equation 5:

$$\hat{X}(k+1,k) = \hat{X}(k,k) + L(k)U(k)$$

$$L(k) = \begin{bmatrix} T\cos\gamma(k) & 0 \\ T\sin\gamma(k) & 0 \\ 0 & T \end{bmatrix} \quad (5)$$

Here, L(k) denotes a transformation matrix linearizing U(k).

The observation predictor 512 transforms system estimation value $\hat{X}(k+1,k)$ into observation prediction value $\hat{Z}(k+1)$. When the sampling time is 1, the observation prediction value by the observation predictor 512 is expressed as the following equation 6:

$$\hat{Z}(k+1) = G(\hat{X}(k+1,k)) \quad (6)$$

The measurement modeling unit 513 receives inputs of the location measuring value of the mobile robot 220 provided by the encoder 224 and the distance value between the docking station 210 and the mobile robot 220 provided by the distance calculator 223, and generates measurement modeling value Z(k+1) as equation 4.

The subtractor 514 obtains the difference between the measurement modeling value Z(k+1) of the mobile robot 220 provided by the measurement modeling unit 513 and the observation prediction value $\hat{Z}(k+1)$ provided by the observation predictor 512.

The Kalman filter 515 obtains optimum estimated value $\hat{X}(k+1,k+1)$ according to the following equation 7:

$$K(k+1) = P(k+1,k)C^T(k+1)\cdot[C(k+1)P(k+1k)C^T(k+1)+S(k+1)]^{-1}$$

$$P(k+1,k) = A_d(k)P(k,k)A_d^T(k) + Q_d(k)$$

$$P(k+1,k+1) = [I - K(k+1)C(k+1)]\cdot P(k+1,k)$$

$$A_d(k) \equiv \begin{bmatrix} 1 & 0 & -v(k)T\sin\gamma(k) \\ 0 & 1 & v(k)T\cos\gamma(k) \\ 0 & 0 & 1 \end{bmatrix} \quad (8)$$

$$Q_d(k) = B_d(k)Q_U B_d^T(k)$$

$$B_d(k) = \begin{bmatrix} T\cos\gamma(k) & 0 \\ T\sin\gamma(k) & 0 \\ 0 & T \end{bmatrix}$$

$$Q_U(k) = \begin{bmatrix} \delta_v & 0 \\ 0 & \delta_\omega \end{bmatrix}$$

-continued $$C(k) \equiv \begin{bmatrix} 1 & 0 & 0 \\ 0 & 1 & 0 \\ 0 & 0 & 1 \\ x(k)(x^2(k)+y^2(k))^{-0.5} & y(k)(x^2(k)+y^2(k))^{-0.5} & 0 \end{bmatrix}$$

The unit time delay unit 516 updates a time operation in time-marching discrete analysis. That is, by passing through the unit time delay unit 516, the current calculation operation $\hat{X}(k+1,k+1)$ becomes previous calculation operation $\hat{X}(k,k)$, which is used in the next calculation operation. Optimum estimation value $\hat{X}(k,k)$ from the unit time delay unit 516 is provided to the system estimator 511.

After repeating the close loop, formed by the system estimator 511, the observation predictor 512, the subtractor 514, the Kalman filter 515 and the unit time delay unit 516, as described above, predetermined times, the system estimator 511 provides an optimum system estimation value $\hat{X}(k+1,k)$ to the travel controller 226. As a result, the error of the travel distance caused by the encoder 224 is compensated for.

Figure 6A:
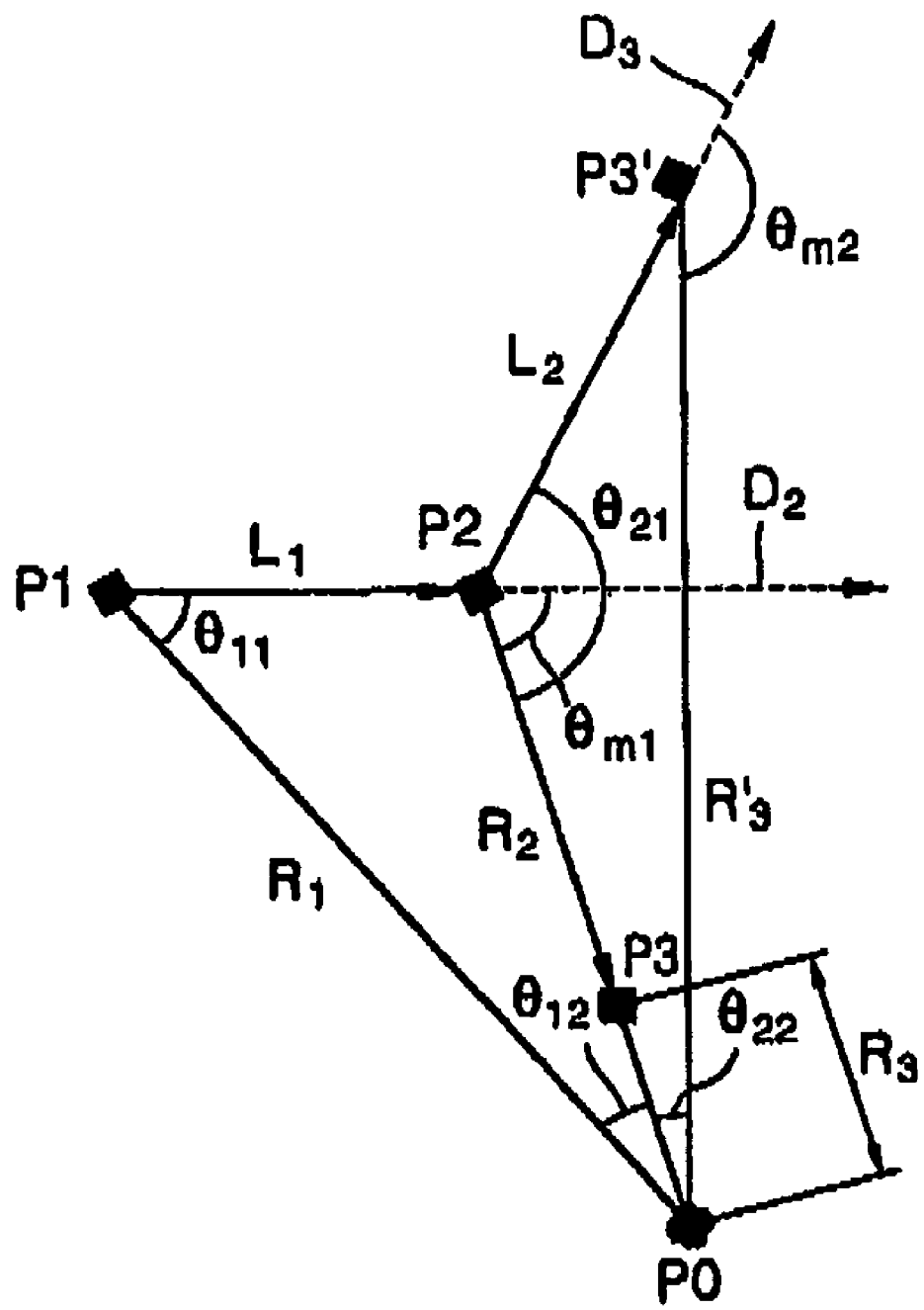
FIG. 6a and FIGS. 6b and 6c are a diagram and flowcharts, respectively, for explaining a method for allowing a mobile robot to return to a docking station according to the present invention.
Figure 6B:
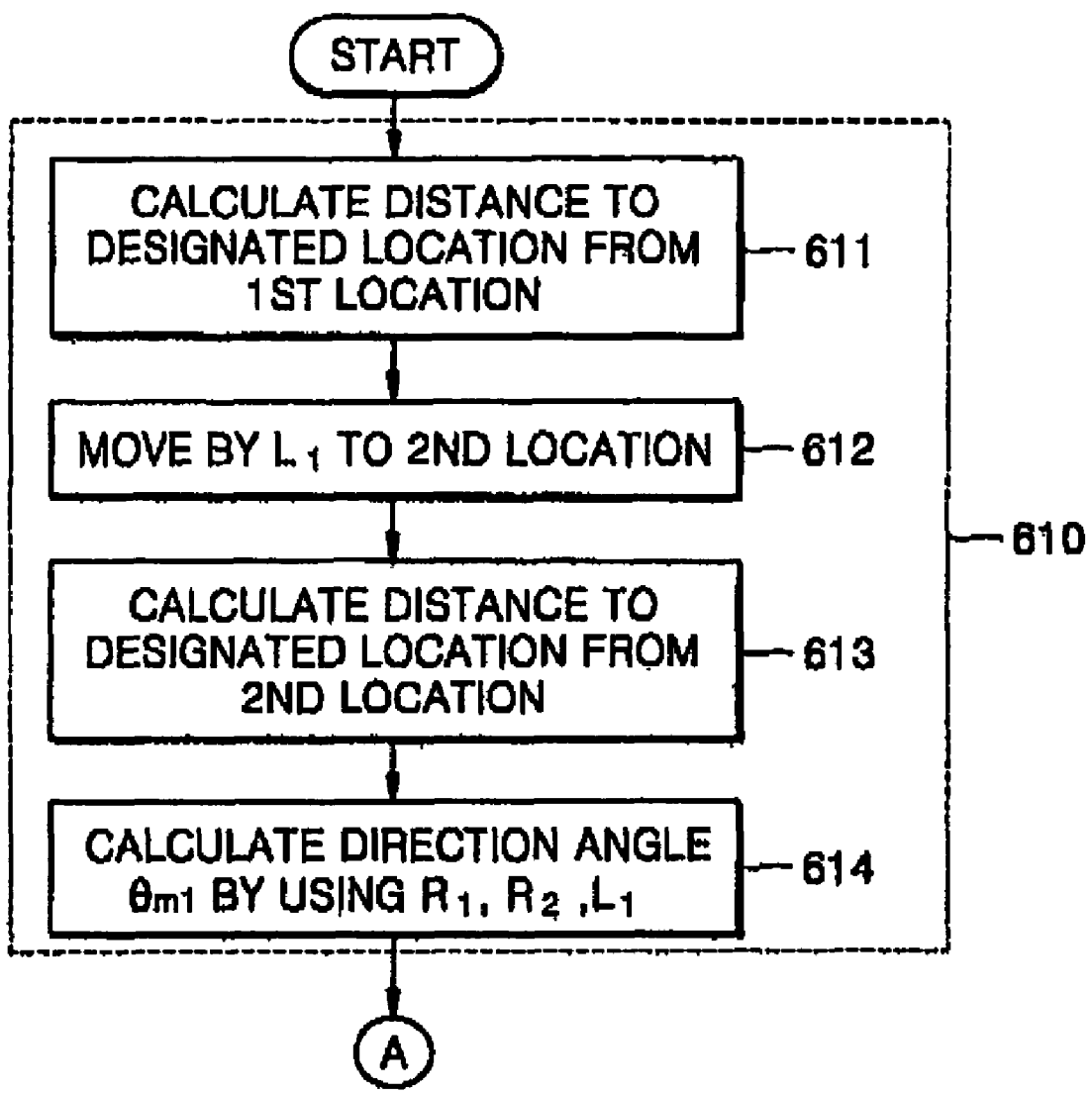
Figure 6C:
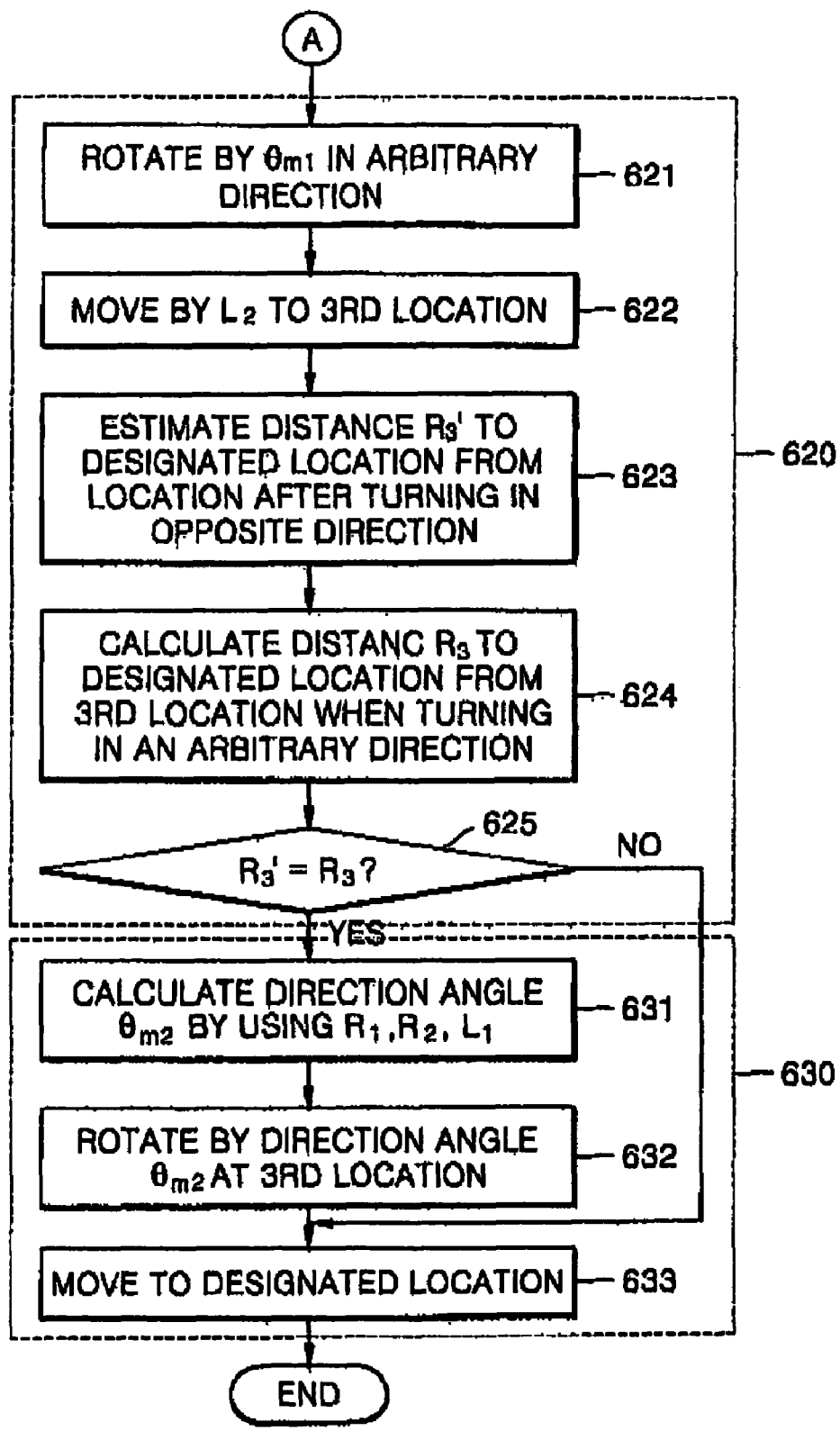

FIG. 6a and FIGS. 6b and 6c are a diagram and flowcharts, respectively, explaining a method for allowing a mobile robot to return to a docking station according to the present invention.

FIG. 6a is a diagram showing the location relations between the mobile robot 220 and the docking station 210. P0 indicates the location of the docking station 210, and P1, P2, P3, and P3' indicate first through third locations and a third estimated location, respectively, of the mobile robot 220. Meanwhile, D2 and D3 indicate moving directions in the second and third locations, respectively, of the mobile robot 220.

FIGS. 6b and 6c are flowcharts explaining a method allowing a mobile robot to return to a docking station according to the present invention, which comprises a first direction angle calculation operation 610, a rotation direction determination operation 620, and a travel control operation 630.

In operation 610 for calculating the first direction angle, at the first location P1 where the mobile robot 220 completes a predetermined job or needs charging, a first distance R1 between the mobile robot 220 and the docking station 210 is calculated in operation 611. By the control of the travel controller 226, the mobile robot travels to the second location P2 in operation 612. At the second location P2, a second distance R2 between the mobile robot 220 and the docking station 210 is calculated in operation 613. By using the first distance R1, the second distance R2 and the travel distance L1 between the first location P1 and the second location P2, a first direction angle θm1 is calculated in operation 614. The first direction angle θm1 can be calculated by the following equation 11:

$$\theta_{m1} = \theta_{11} + \theta_{12} \quad (11)$$

where $$\theta_{11} = \cos^{-1}\left(\frac{R_1^2 + L_1^2 - R_2^2}{2R_1 L_1}\right)$$

$$\theta_{12} = \cos^{-1}\left(\frac{R_1^2 + R_2^2 - L_1^2}{2R_1 R_2}\right)$$

In equation 11, the first distance R1 and the second distance R2 are calculated by the distance calculator 223 and the travel distance L1 between the first location P1 and the second location P2 are provided by the encoder 224. Preferably, the travel distance L1 between the first location P1 and the second location P2 can be compensated by the compensator 225 for the error caused by slipping on the ground.

In operation 620 for determining a rotation direction, the mobile robot 220 is rotated by the first direction angle θm1 calculated in operation 614 by the control of the travel controller 226, in operation 621. At this time, the robot 220 is rotated by the first direction angle θm1 in an arbitrary direction, that is, clockwise or counterclockwise. That is, through the first direction angle θm1 calculated in operation 614, it cannot be determined whether the rotation should be clockwise (+) or counterclockwise (-). Accordingly, the robot 220 is rotated by the first direction angle θm1 in an arbitrary direction in operation 621. By controlling the travel controller 226, the mobile robot 220 travels to the third location P3 in operation 622. The third distance R3 between the mobile robot 220 and the docking station 210 is calculated at the third location P3 in operation 623.

The distance R3' between the docking station 210 and the robot 220 at the location P3', which is estimated after the robot 220 rotates by the first direction angle θm1 in a direction of increasing distance from the docking station 220 and travels a predetermined distance, is estimated in operation 624. The estimated distance R3' from the docking station 210 can be calculated by the following equation 12:

$$R_3' = \sqrt{R_2^2 + L_2^2 - 2R_2 L_2 \cos 2\theta_{m1}} \quad (12)$$

The third distance R3 calculated in operation 623 is compared with the estimated distance R3' of operation 624 in operation 625.

In the travel control operation 630, by using the second distance R2, the third distance R3 and the travel distance L2 between the second location P2 and the third location P3, a second direction angle θm2 is calculated in operation 631. The second direction angle θm2 can be calculated by the following equation 13:

$$\theta_{m2} = \theta_{21} + \theta_{22} \quad (13)$$

where $$\theta_{21} = \cos^{-1}\left(\frac{R_2^2 + L_2^2 - R_3^2}{2R_2 L_2}\right)$$

$$\theta_{22} = \cos^{-1}\left(\frac{R_2^2 + R_3^2 - L_2^2}{2R_2 R_3}\right)$$

In equation 13, the second distance R2 and the third distance R3 are calculated by the distance calculator 223 shown in FIG. 2 and the travel distance L2 between the second location P2 and the third location P3' are provided by the encoder 224 shown in FIG. 2. Preferably, the travel distance L2 between the second location P2 and the third location P3 provided by the encoder 224 can be compensated by the compensator 225 for the error caused by slipping on the ground.

When the result of the comparison in operation 625 indicates that the third distance R3 is different from the estimated distance R3', the mobile robot 220 is controlled to travel according to the first direction angle θm1 in the same direction as the rotation direction in operation 621, in operation 632. In operation 633, if the result of comparison in operation 625 indicates that the third distance R3 is the same as the estimated distance R3', the mobile robot 220 is controlled to travel according to the second direction angle θm2. At this time, for the rotation direction of the mobile robot 220, it is determined whether θm1 is an acute angle or an obtuse angle. If θm1 is an acute angle, for the second direction angle θm2, the mobile robot 220 rotates in the direction opposite to the rotation direction of the first direction angle θm1, while if θm1 is an obtuse angle, for the second direction angle θm2, the mobile robot 220 rotates in the same direction as the rotation direction of the first direction angle θm1.

The embodiments of the present invention described above may be embodied in a code, which can be read by a computer, on a computer readable recording medium. The computer readable recording medium includes all kinds of recording apparatuses on which computer readable data are stored. The computer readable recording media includes ROMs, RAMs, CD-ROMs, magnetic tapes, hard disks, floppy disks, flash memories, and optical data storage devices. Also, it may be implemented in the form of a carrier wave (for example, transmitted over the Internet). Also, the computer readable recording media can be scattered on computer systems connected through a network and can store and execute a computer readable code in a distributed mode. Also, functional programs, codes and code segments to implement the present invention can be easily inferred by the programmers in the technology field of the present invention.

According to the present invention, as described above, the docking station and the mobile robot have a sound wave transmitter and a receptor, respectively. According to the distance between the mobile robot and the docking station, calculated by using the sound wave and travel distance provided by the encoder, the direction angle and rotation direction of the mobile robot to return to the docking station from a current location are determined such that accurate return of the mobile robot is guaranteed and the returning time can be reduced. In addition, the travel distance information of the encoder affected by slipping of the ground is compensated for by using the distance between the mobile robot and the docking station calculated based on the received sound wave such that an accurate direction angle can be calculated. Further, separate artificial parts do not need to be attached on walls or a ceiling of a predetermined space where the mobile robot is placed, and accordingly, the system can be implemented at a low cost.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of allowing a mobile robot to return to a designated location, wherein the designated location has a sound wave transmitter and the mobile robot has a sound wave receptor and the mobile robot automatically returns from a first location to the designated location, the method comprising:

calculating a first direction angle of the mobile robot at a second location arrived at after the mobile robot travels a first distance from the first location, including determining the first direction angle as being dependent on an angle between a projected meeting of a corresponding mobile robot path from the first location to the second location and a projection from the second location to the designated location;

determining whether the mobile robot approaches or moves away from the designated location, at a third location arrived at after the mobile robot rotates by the first direction angle and then travels a second distance; and if the result of the determination indicates that the mobile robot approaches the designated location, controlling the mobile robot to travel according to the first direction angle, and if the result indicates the mobile robot moves away from the designated location, calculating a second direction angle of the mobile robot at the third location, and controlling the mobile robot to travel according to the second direction angle.

2. The method of claim 1, wherein the first and second direction angles are calculated by using a distance between the mobile robot and the designated location calculated from a time difference between a time when the sound wave transmitter transmits a sound wave and a time when the sound wave receptor receives the sound wave, and a travel distance provided by an encoder connected to a motor of the mobile robot.

3. The method of claim 1, wherein the calculating the first direction angle comprises:
at the first location, calculating a first distance between the mobile robot and the designated location;
after traveling the mobile robot to the second location from the first location, calculating at the second location a second distance between the mobile robot and the docking station; and
calculating the first direction angle by using the first distance, the second distance and a travel distance between the first location and the second location.

4. The method of claim 3, wherein the determining whether the mobile robot approaches or moves away from the designated location comprises:
rotating the mobile robot by the first direction angle in an arbitrary direction and traveling the mobile robot to a third location;
at the third location, calculating a third distance between the mobile robot and the designated location;
estimating the distance to the designated location from the third location after the mobile robot rotates by the first direction angle in the direction of increasing distance from the designated location and travels a predetermined distance between the second location and the third location; and
comparing the calculated third distance with the estimated distance.

5. The method of claim 4, wherein the controlling the mobile robot to travel comprises:
calculating a second direction angle of the mobile robot by using the second distance, the third distance and the travel distance between the second location and the third location;
if the result of the comparison indicates that the third distance is different from the estimated distance, controlling the mobile robot to travel according to the first direction angle; and
if the result of the comparison indicates that the third distance is the same as the estimated distance, controlling the mobile robot to travel according to the second direction angle.

6. The method of claim 5, wherein rotating the mobile robot by the first direction angle in an arbitrary direction comprises:
if the first direction angle is an acute angle, the rotation direction of the second direction angle is controlled to be opposite to the rotation direction of the first direction angle; and if the first direction angle is an obtuse angle, the rotation direction of the second direction angle is controlled to be the same as the rotation direction of the first direction angle.

7. The method of claim 2, wherein the time difference between the time of transmitting the sound wave from the designated location incident on the mobile robot, and the time of receiving the sound wave is calculated based on the transmission and reception time points of a predetermined time synchronization signal from the designated location incident on the mobile robot.

8. The method of claim 7, wherein a speed of transmission of the time synchronization signal is faster than a speed of transmission of the sound wave.

9. The method of claim 7, wherein the time synchronization signal is one of an infrared (IR) signal or a radio frequency (RF) signal, and the sound wave is an ultrasonic wave.

10. The method of claim 2, wherein the time difference between the transmission time and the reception time of the sound wave from the designated location incident on the mobile robot is calculated based on a predetermined timing signal.

11. The method of claim 2, wherein the travel distance provided by the encoder is compensated for an error caused by slipping on a ground, by a Kalman filtering technique using the first through third location information.

12. The method of claim 1, wherein a program enabling the method is recorded on a computer-readable recording medium.

13. An apparatus for allowing a mobile robot to automatically return to a designated location from a first location, the apparatus comprising:
a sound wave transmitter installed on the designated location transmitting a sound wave;
a sound wave receptor installed in the mobile robot receiving the sound wave;
a distance calculator which calculates a distance between the designated location and the mobile robot, by using a time difference between times of transmission and reception of the sound wave transmitted by the sound wave transmitter to the sound wave receptor;
an encoder connected to at least one or more motors and measuring a travel distance and a travel direction of the mobile robot; and
a travel controller which by using the distance calculated in the distance calculator and the travel distance measured by the encoder, calculates a first direction angle at a second location arrived at after the mobile robot travels a first distance between the first location and the second location, determines whether the mobile robot approaches or moves away from the designated location, at a third location arrived at after the mobile robot is rotated by a first direction angle and travels a second distance between the second location and the third location, and controls the mobile robot to travel according to the result of the determination,
wherein the calculating of the first direction angle includes determining the first direction angle as being dependent on an angle between a projected meeting of a corresponding mobile robot oath from the first location to the second location and a projection from the second location to the designated location.

14. The apparatus of claim 13, further comprising:
a time synchronization signal transmitter included in the designated location and generating and transmitting a time synchronization signal; and a time synchronization signal receptor included in the mobile robot and receiving the time synchronization signal.

15. The apparatus of claim 14, wherein a speed of transmission of the time synchronization signal is faster than a speed of transmission of the sound wave.

16. The apparatus of claim 14, wherein the time synchronization signal is one of an infrared (IR) signal or a radio frequency (RF) signal, and the sound wave is an ultrasonic wave.

17. The apparatus of claim 14, wherein the distance between the designated location and the mobile robot is calculated based on a gap between a time when the time synchronization signal receptor receives the time synchronization signal and a time when the sound wave receptor receives the sound wave.

18. The apparatus of claim 13, further comprising:
a first timer included in the designated location and generating a timing signal with which the sound wave is transmitted to the mobile robot in synchronization; and
a second timer included in the mobile robot and generating the same timing signal as that provided from the first timer.

19. The apparatus of claim 18, wherein the distance between the designated location and the mobile robot is calculated based on a difference between a time when the second timer generates a timing signal and a time when the sound wave receptor receives the sound wave from the sound wave transmitter.

20. The apparatus of claim 13, further comprising:
a compensator which receives inputs of a linear velocity command and an angular velocity command provided by the travel controller, the travel distance and the travel direction information of the mobile robot provided by the encoder, and distance information between the designated location and the mobile robot calculated by the distance calculator, and by using a Kalman filtering technique, compensates for an error between a travel distance measured by the encoder and the actual travel distance.

21. The apparatus of claim 13, wherein if the mobile robot approaches the designated location, the travel controller controls the mobile robot to travel according to the first direction angle and if the mobile robot moves away from the designated location, the travel controller calculates a second direction angle of the mobile robot at the third location and controls the mobile robot to travel according to the second direction angle.

22. The apparatus of claim 13, wherein the travel controller calculates the first direction angle by using the first distance between the mobile robot at the first location and the designated location, the second distance between the mobile robot at the second location, and the designated location, and the travel distance between the first location and the second location.

23. The apparatus of claim 21, wherein the travel controller calculates the second direction angle by using the second distance, a third distance between the mobile robot at the third location, arrived at after the mobile robot rotates by the first direction angle in an arbitrary direction at the second location and travels a predetermined distance, and the travel distance between the second location and the third location.

24. The apparatus of claim 23, wherein if at the second location the mobile robot rotates in the direction of increasing distance from the docking station, the travel controller estimates the distance between the mobile robot at the third location and the designated location, and if the third distance is different from the estimated distance, controls the mobile robot to travel according to the first direction angle, and if the third distance is the same as the estimated distance, controls the mobile robot to travel according to the second direction angle.

25. The apparatus of claim 24, wherein the travel controller determines the rotation direction of the second direction angle according to whether the first direction angle is an acute angle or an obtuse angle.

26. A computer readable medium encoded with processing instructions for performing a method of allowing a mobile robot to return to a designated location, wherein the designated location has a sound wave transmitter and the mobile robot has a sound wave receptor and the mobile robot automatically returns from a first location to the designated location, the method comprising:
calculating a first direction angle of the mobile robot at a second location arrived at after the mobile robot travels a first distance from the first location, including determining the first direction angle as being dependent on an angle between a projected meeting of a corresponding mobile robot path from the first location to the second location and a projection from the second location to the designated location;
determining whether the mobile robot approaches or moves away from the designated location, at a third location arrived at after the mobile robot rotates by the first direction angle and then travels a second distance; and
if the result of the determination indicates that the mobile robot approaches the designated location, controlling the mobile robot to travel according to the first direction angle, and if the result indicates the mobile robot moves away from the designated location, calculating a second direction angle of the mobile robot at the third location, and controlling the mobile robot to travel according to the second direction angle.

27. A method of returning a mobile robot to a designated location, wherein the designated location has a sound wave transmitter and the mobile robot has a sound wave receptor and the mobile robot automatically returns from a first location to the designated location, the method comprising:
moving the mobile robot to a second location which is a first distance from the first location;
calculating a first direction angle of the mobile robot upon the mobile robot reaching the second location, the first direction angle being an angle between the mobile robot's current direction of travel and a projected direction of travel directly towards the designated location;
moving the mobile robot to a third location which is a second distance from the second location, travelled in the direction of the first direction angle, upon the first direction angle being calculated;
calculating a second direction angle of the mobile robot at the third location and subsequently moving the mobile robot in the direction of the second direction angle upon the mobile robot reaching the third location and determining that the mobile robot has moved away from the designated location; and
moving the mobile robot in the direction of the first direction angle upon the mobile robot reaching the third location and determining that the mobile robot has moved towards the designated location.

* * * * *

UNITED STATES PATENT AND TRADEMARK OFFICE
CERTIFICATE OF CORRECTION

PATENT NO. : 7,546,179 B2
APPLICATION NO. : 10/823548
DATED : June 9, 2009
INVENTOR(S) : Hyoung-ki Lee et al.

It is certified that error appears in the above-identified patent and that said Letters Patent is hereby corrected as shown below:

Column 12, Line 60, change "oath" to --path--.

Signed and Sealed this

Twenty-ninth Day of September, 2009

David J. Kappos
*Director of the United States Patent and Trademark Office*